United States Patent
Ho

(10) Patent No.: US 7,230,403 B2
(45) Date of Patent: Jun. 12, 2007

(54) SYSTEM AND METHOD FOR ELIMINATION OF DC OFFSET FEEDBACK IN AC DRIVES

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/835,966

(22) Filed: Apr. 29, 2004

(65) Prior Publication Data

US 2005/0242767 A1 Nov. 3, 2005

Related U.S. Application Data

(60) Provisional application No. 60/466,486, filed on Apr. 29, 2003.

(51) Int. Cl.
*H02P 23/00* (2006.01)
*H02P 25/00* (2006.01)
*H02P 27/00* (2006.01)
*H02P 27/04* (2006.01)

(52) U.S. Cl. ............... 318/808; 318/254; 318/432; 318/434; 318/722; 318/727; 318/801; 318/811; 318/812

(58) Field of Classification Search .......... 318/808, 318/716, 702, 727, 767, 610, 609, 801, 722, 318/254, 138, 439
See application file for complete search history.

(56) References Cited

U.S. PATENT DOCUMENTS

| | | | | | |
|---|---|---|---|---|---|
| 5,278,486 | A | * | 1/1994 | Kim | 318/811 |
| 5,905,644 | A | * | 5/1999 | Blasko et al. | 363/41 |
| 6,014,007 | A | * | 1/2000 | Seibel et al. | 318/805 |
| 6,259,226 | B1 | * | 7/2001 | Kaitani et al. | 318/798 |
| 6,344,726 | B1 | * | 2/2002 | Tobari et al. | 318/727 |
| 6,552,508 | B1 | * | 4/2003 | Ho et al. | 318/727 |
| 6,577,096 | B2 | * | 6/2003 | Cho | 318/727 |
| 6,646,409 | B2 | * | 11/2003 | Won et al. | 318/701 |
| 2003/0128009 | A1 | * | 7/2003 | Sakurai et al. | 318/722 |

* cited by examiner

*Primary Examiner*—Lincoln Donovan
*Assistant Examiner*—Erick Glass
(74) *Attorney, Agent, or Firm*—Osterlenk, Faber, Gerb & Soffen, LLP

(57) ABSTRACT

A DC offset compensation system and method significantly reduce a DC offset voltage in the voltage feedback loop of an AC motor drive control system. A control voltage error signal is demodulated and filtered and applied to the closed loop voltage feedback signals to compensate for DC offset voltages in the closed loop voltage feedback. A frequency discriminator tuned to the fundamental motor frequency improves the precision of the DC offset detection. A startup flux DC offset compensation operates to eliminate initial startup flux DC offset. Motor flux compensation is improved through a variable flux filter time constant.

18 Claims, 6 Drawing Sheets

SYSTEM AND METHOD FOR ELIMINATION OF DC OFFSET FEEDBACK IN AC DRIVES

RELATED APPLICATION

The present application is based on and claims benefit of U.S. Provisional Application No. 60/466,486, filed Apr. 29, 2003, entitled On Line Elimination Feedback DC Offset for Vector AC Drivers, to which a claim of priority is hereby made.

BACKGROUND OF THE INVENTION

1. Field of the Invention

The present invention relates generally to AC motor drive control systems, and relates more particularly to improving performance of AC motor drive control systems.

2. Description of Related Art

Sensorless AC drives provide a number of advantages over motor drive systems that include position feedback devices such as encoders or resolvers. Operating AC drives in a sensorless control scheme can reduce system costs and simplify implementation, and provide a number of other advantages in typical environments in which AC motor drives are employed.

Sensorless AC drive control schemes often benefit from a voltage feedback derived from the power signals supplied to the motor. A closed loop voltage feedback can improve the control system responsiveness, and in particular when used with the current feedback typically employed in a sensorless AC motor drive. One advantage of voltage feedback is improved drive performance especially at low speed operation. A number of non-linearities and other system variables can be largely suppressed by providing a closed loop voltage control. For example, inverter dead time, conduction losses and switching losses, which are typical non-linear variables in the motor drive system can be compensated with a high bandwidth voltage regulating loop. Such a voltage regulating loop may operate at 1500 rad/sec, for example. Sophisticated motor drive control systems also use on line motor parameter estimation algorithms that use motor voltages as input signals. Accordingly, using voltage feedback for AC drive control systems permits a number of high performance control opportunities in the implementation of an AC drive system.

One of the difficulties with voltage feedback sensing is a DC offset typically found in the feedback circuitry. A DC offset in the feedback circuitry can cause unwanted drive torque oscillations, and can even lead to unstable drive operation. One technique to solve the problem of a DC offset is to nullify the sensor feedbacks at initialization, prior to operating the drive system. However, once the motor drive is initialized and running, it is difficult to continue to nullify the DC offset due to the presence of high amplitude AC signals. For the sake of ease of implementation, offset compensation is typically frozen until the motor drive is no longer running, at which point a DC offset compensation can again be performed. DC offset voltage may vary significantly during long duration runs of a motor drive, and significant unwanted torque ripple can eventually develop as the DC offset voltage continues to build. It would be desirable to eliminate the DC offset while the motor drive system is on line and running.

SUMMARY OF THE INVENTION

In accordance with the present invention, there is provided a system and method that provides a continuous voltage feedback sensor offset correction with a high bandwidth to remove DC offset in the voltage feedback of a motor drive system. The system and method are implemented on line, that is, while the AC motor is operating, and can greatly diminish problems associated with DC offset and AC motor drive control systems.

Voltage and current feedback signals are typically transformed to a synchronously rotating reference frame for use with the motor drive control system. DC offsets on the voltage and current feedback signals are typically represented as AC signals when the feedback signals are transformed to the synchronously rotating reference frame. The AC signals representing the DC offsets have a frequency approximately equal to the motor fundamental frequency after the transformation. The transformation is typically performed to be synchronous with the inverter fundamental frequency for use in the motor control system. The present invention operates to extract the DC offset information from the AC signature after the transformation. The extracted information is applied to compensate for the DC offset present in the feedback signals. A frequency discriminator may be used to tune the AC signature to extract the DC offset information with high sensitivity. By extracting the DC offset according to the present invention, a high sensitivity and a correspondingly high bandwidth is obtained to significantly improve performance of the AC motor drive control system. In addition, the method and system according to the present invention is straightforwardly implemented in AC vector control drives.

Other features and advantages of the present invention will become apparent from the following description of the invention which refers to the accompanying drawings.

DETAILED DESCRIPTION OF THE PREFERRED EMBODIMENTS

Figure 1:
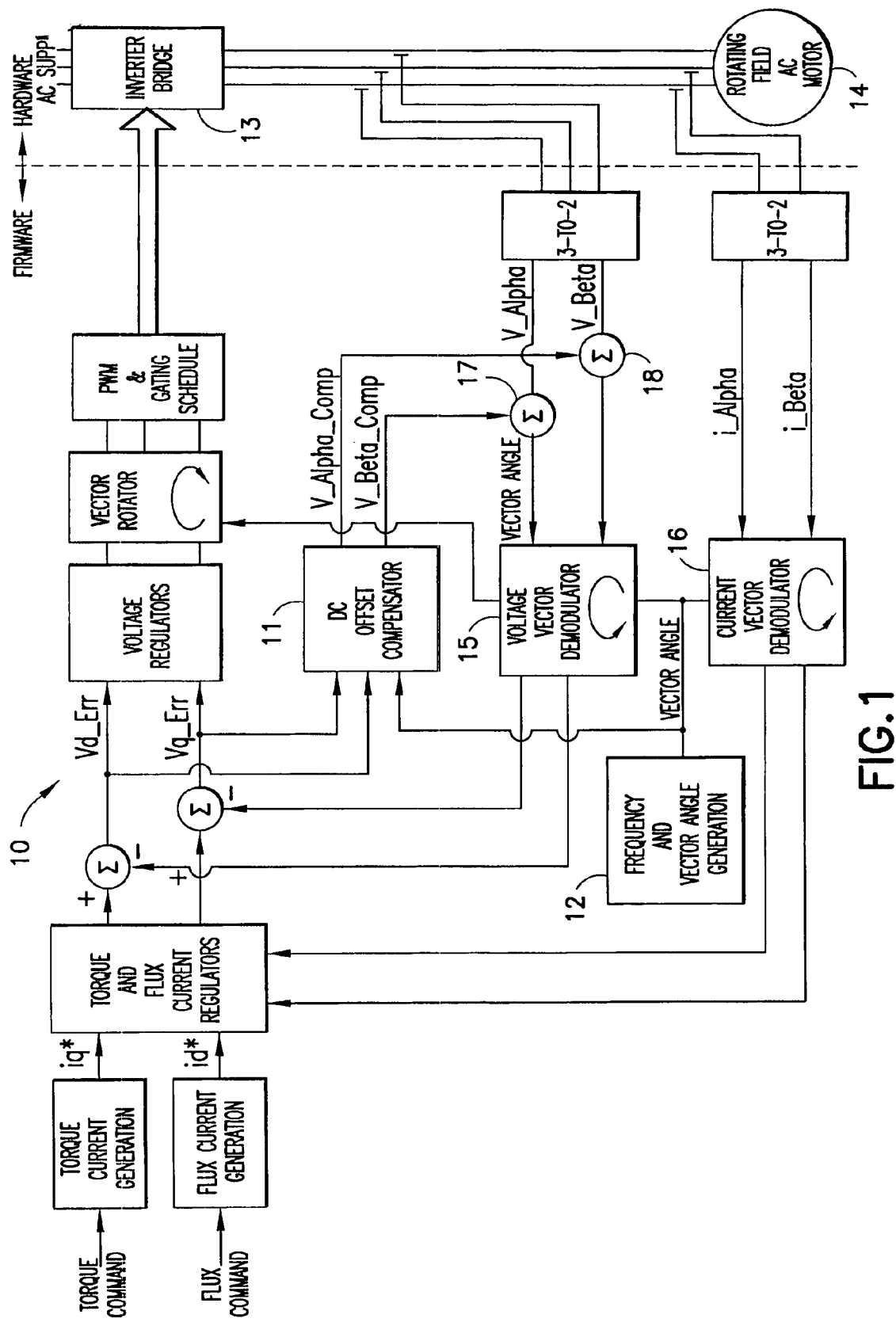
FIG. 1 is a block diagram of a motor drive control system with DC offset compensation in accordance with the present invention.

Referring now to FIG. 1, a motor drive control system 10 is illustrated in block diagram format. A DC offset compensator 11 is shown with a vector angle input, and voltage error signals VD_ERR and VQ_ERR. The vector angle is generated as a command vector angle from frequency and vector angle generation block 12. Motor drive system 10 is a sensorless AC vector drive that derives feedback from the power signals generated from inverter 13 delivered to AC motor 14. Voltage vector demodulator 15 and current vector demodulator 16 transform the voltage and current signals i_Alpha, i_Beta obtained from the inverter power signals to provide rotating reference frame feedback signals for use in the voltage and current control loops. The DC offset compensation provided by compensator 11 is injected into the voltage feedback loop at summations 17 and 18 to compensate the voltage feedback signals prior to transformation.

DC voltage offset is nulled, or compensated, using forward control loop signals VD_ERR and VQ_ERR. Together with the command vector angle, compensator 11 generates DC offset compensation signals V_Alpha COMP and V_Beta_COMP. If the DC offset builds up in the voltage feedback at points V_Alpha and V_Beta, the forward control loop signals VD_ERR and VQ_ERR contain an AC component that has a frequency approximately equal to that of the fundamental motor frequency. In a vector control drive, the command frequency and the voltage error are readily available signals. Compensator 11 output signals V_Alpha_COMP and V_Beta_COMP influence feedback signals V_Alpha and V_Beta to cancel out the DC offset so that the signals provided to voltage vector demodulator 15 have a significantly reduced DC offset component.

Figure 2:
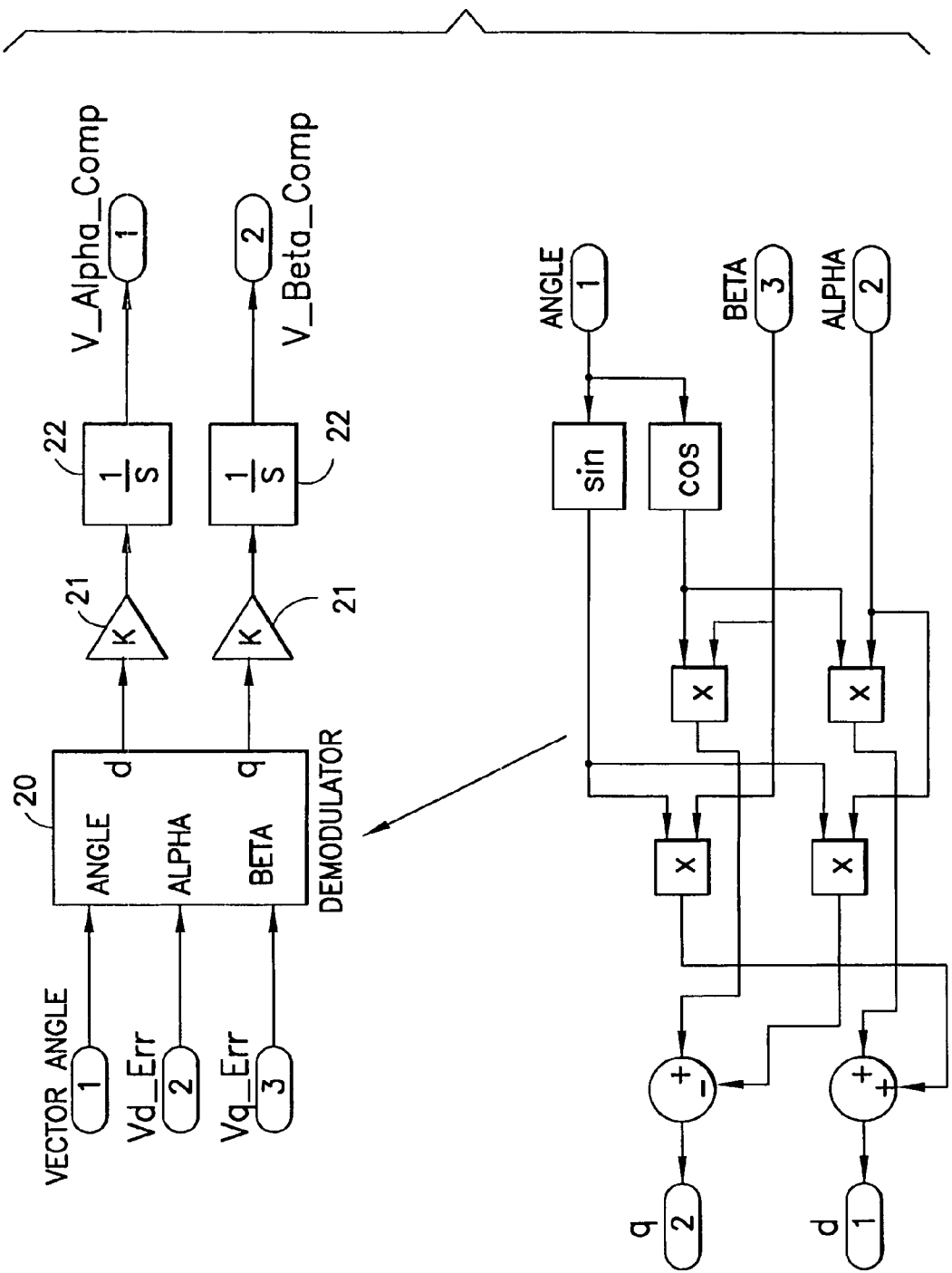
FIG. 2 is a block diagram of the DC offset compensator in accordance with the present invention.

A frequency discriminator may be used to refine the DC offset compensation by tuning the frequency discriminator to the fundamental frequency of the motor. Referring to FIG. 2, DC offset information can be extracted with high precision, and compensation signals can be easily derived. A demodulator 20 demodulates the rotating reference frame signals of the vector angle. VD_ERR and VQ_ERR to outputs D and Q to obtain the separate compensation components for the voltage feedback loop. The D and Q outputs of demodulator 20 are passed through an integral compensation with a gain K indicated with blocks 21 and 22. The resulting signals, V_Alpha_COMP and V_Beta_COMP are applied to their respective voltage feedback signals V_Alpha and V_Beta to remove or decrease the DC offset present in the voltage feedback.

Also shown in FIG. 2 is a system block diagram of demodulator 20 with inputs of an Angle signal and Alpha and Beta signals. Demodulator 20 outputs signals D and Q, which are derived according to the following equations.

$$d = \alpha \cos\theta + \beta \sin\theta$$

$$q = \beta \cos\theta - \alpha \sin\theta$$

Figure 3:
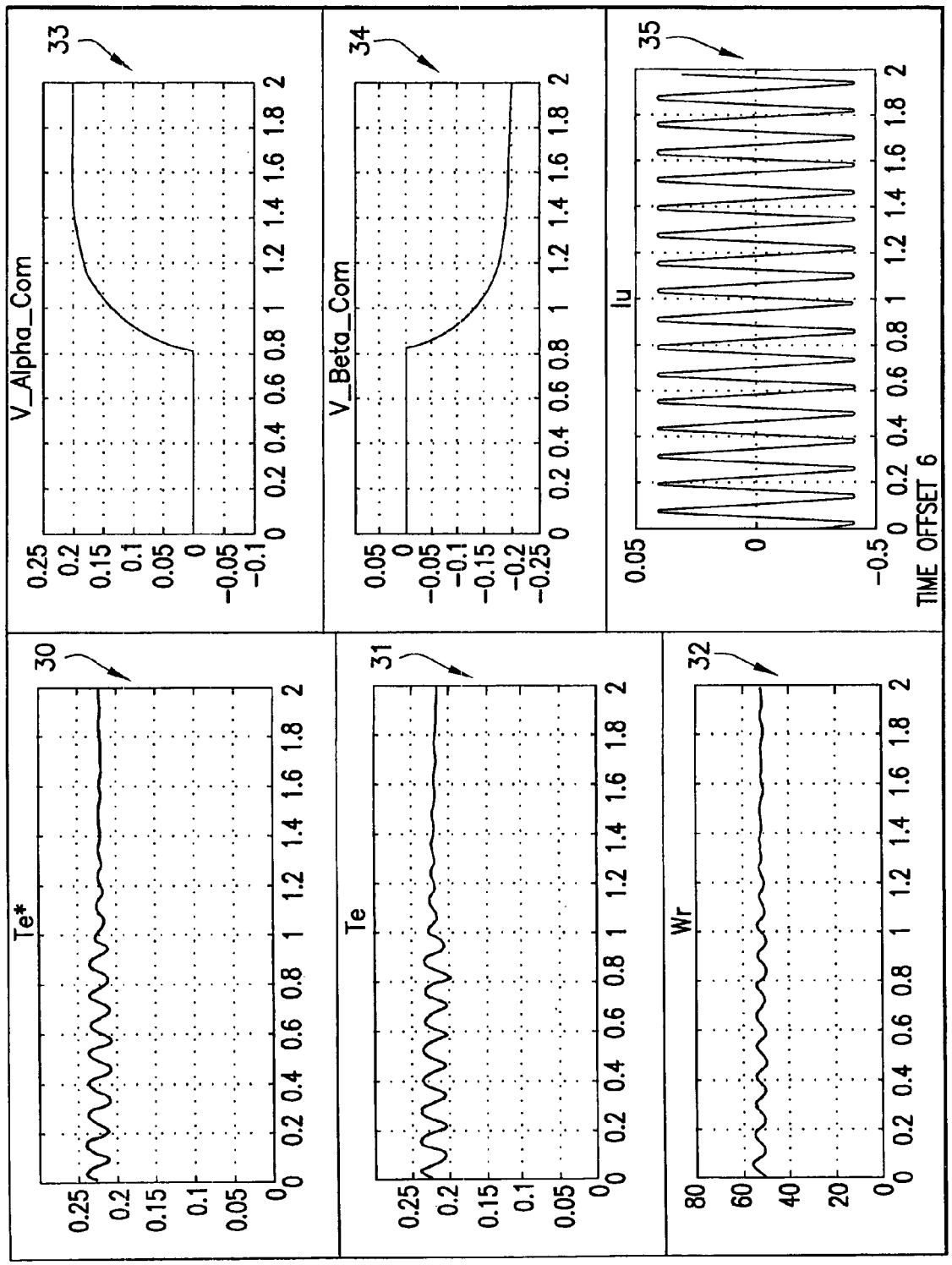
FIG. 3 is a set of graphical illustrations showing system responsiveness with DC offset compensation in accordance with the present invention.

Referring now to FIG. 3, graphical plots 30–35 illustrate various motor drive control system parameters with DC offset compensation in accordance with the present invention. In FIG. 3, Te* represents a torque command in Newton-meters, Te represents motor torque in Newton-meters, Wr represents motor speed in radians per second, Iu represents the phase current of phase u, Id* represents the flux current command and Iq* represents the torque current command. As described in FIGS. 1 and 2, V_Alpha represents the voltage feedback Alpha phase signal derived from a three phase to two phase transformation and V_Beta represents a voltage feedback Beta phase from a three phase to two phase transformation. V_Alpha_COMP represents a DC offset compensator output and V_Beta_COMP represents another DC offset compensator output.

The DC offset compensator was tested by artificially injecting voltage offset errors of approximately 0.2 volts in the voltage feedback signals V_Alpha and V_Beta. As can be seen in plots 30–32, torque command Te*, motor torque Te and motor speed Wr include an AC component that causes motor operation instability. Initially, in plots 30–35, the DC offset compensator is turned off. At approximately T=0.82 seconds, the DC offset compensator is enabled and begins generating DC offset compensation signals. As shown in plots 33 and 34, compensation signals V_Alpha_COMP and V_Beta_COMP each experience a change in magnitude of approximately 0.2 volts, with V_Alpha_COMP moving in the positive direction while V_Beta_COMP moves in the negative direction. As the DC offset compensation signals begin to impact the motor drive voltage feedback, the oscillations in torque command Te*, motor torque Te and motor speed Wr significantly decrease to extremely small values. Plot 35 illustrates phase current Iu operating at a frequency approximately the same as the oscillation component seen in graphical plots 30–32 manifested from the DC offset signal.

Figure 4:
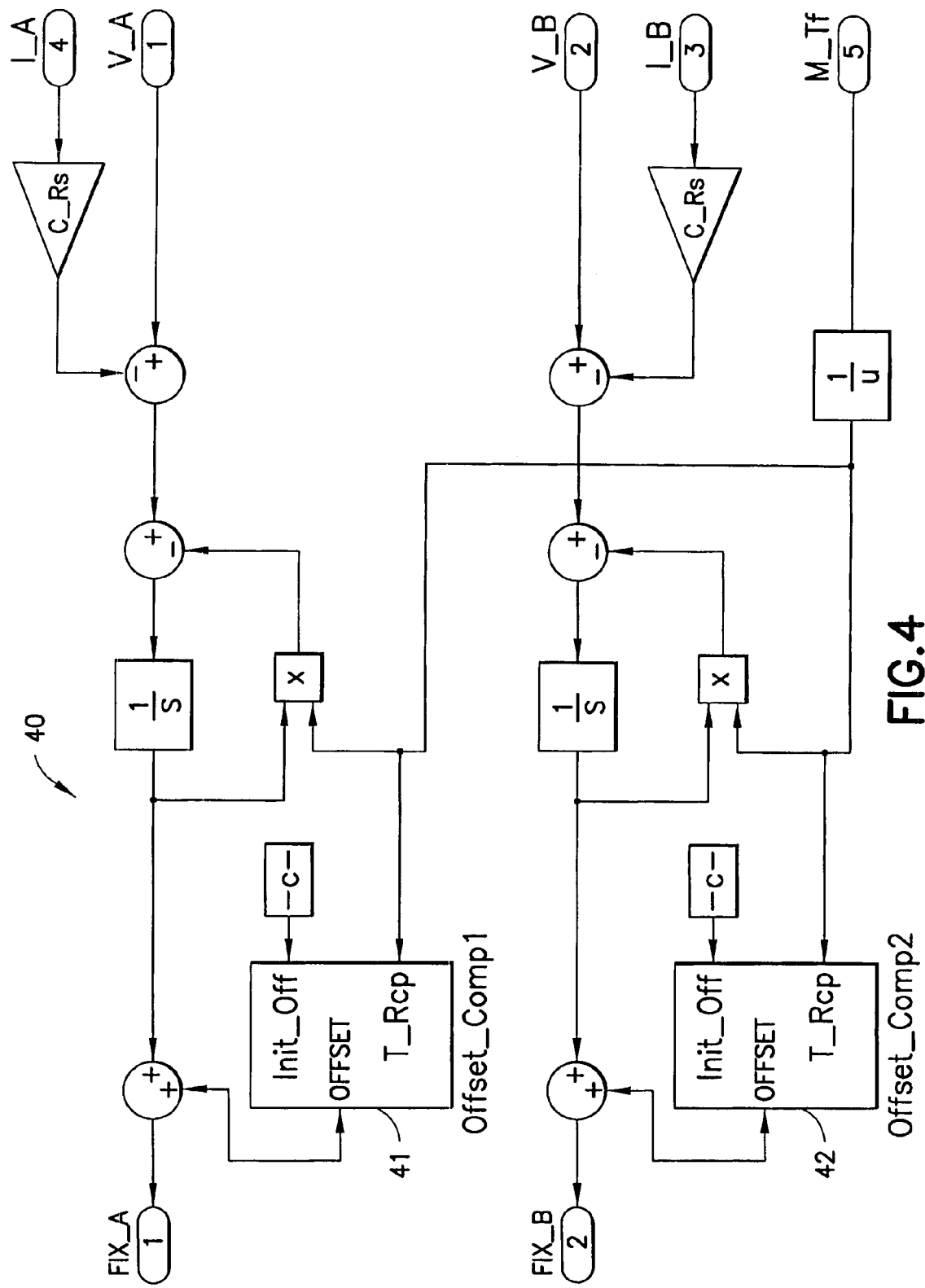
FIG. 4 is a system block diagram of an initial flux estimation offset compensator according to the present invention.

The elimination of an initial startup flux DC offset in AC motor drive system 10 may also be contemplated. Referring to FIG. 4, a simple system block diagram 40 illustrates the calculation of an initial startup flux DC offset compensation. Offset compensation blocks 41, 42 provide compensation to flux signals Flx_A and Flx_B, respectively. The offset compensation can be based on a variable flux filter time constant. For example, signal M_Tf can be made to vary during startup to influence offset compensation.

Figure 5:
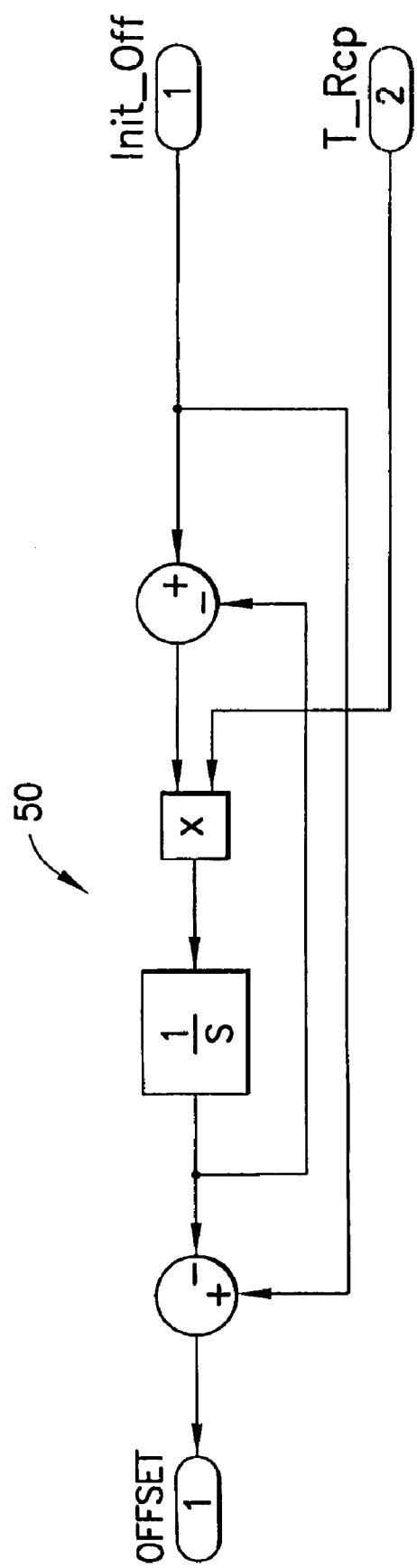
FIG. 5 is a system block diagram of an offset compensator block according to the present invention.
Figure 6:
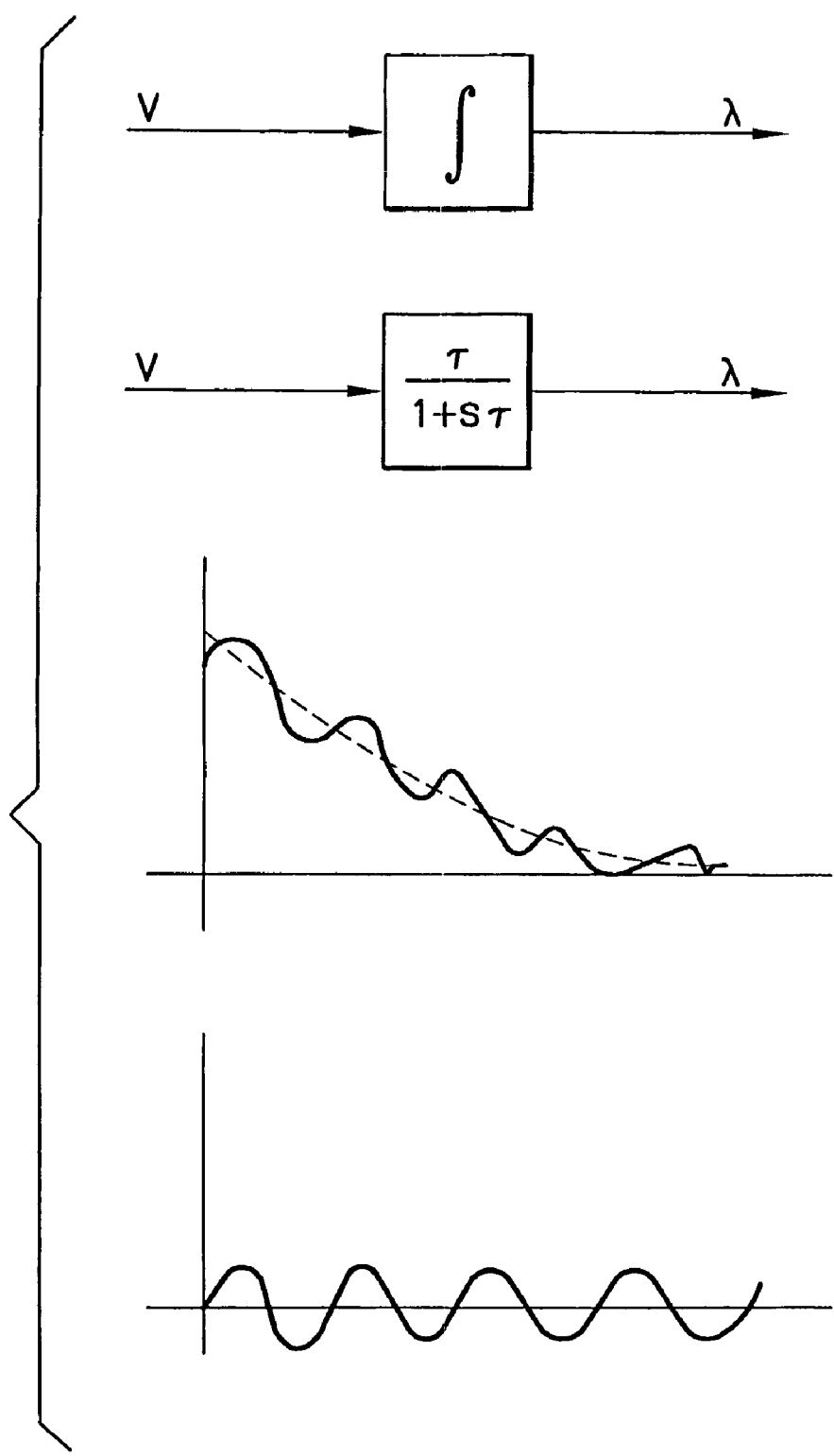
FIG. 6 is an illustration of system blocks for initial flux estimation offset compensation and graphical representations of offset compensation.

Referring to FIG. 5, a system block diagram 50 shows the initial offset compensation applied to the estimated flux signals to obtain an initial flux offset compensation during startup. The initial offset compensation in diagram 50 represents the internal functionality of offset compensation blocks 41, 42 shown in FIG. 4. A diagram of the corresponding system representation is shown in FIG. 6, along with graphical representations showing the elimination of initial flux estimation offset. By providing a variable flux filter time constant initial startup flux DC offset can be eliminated rapidly according to the compensation technique of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A DC offset compensator for a motor drive control system, comprising:

a demodulator in a closed loop feedback voltage circuit for receiving a voltage feedback signal and providing a demodulated output including a voltage error signal;

a DC offset compensator coupled to the demodulator to receive the demodulated output and provide a DC offset compensation signal;

a summing junction in the closed loop voltage feedback circuit coupled to the DC offset compensator for receiving the DC offset compensation signal, whereby the voltage feedback signal is influenced by the DC offset compensation signal to reduce an impact of a DC offset voltage.

2. The compensator according to claim 1, wherein the voltage error signal comprises two voltage error signals which are demodulated and applied to the DC offset compensator to produce two DC offset compensation signals.

3. The compensator according to claim 1, further comprising a vector angle input applied to the demodulator to contribute to producing the demodulated output.

4. The compensator according to claim 2, further comprising a plurality of summing junctions in the closed loop voltage feedback circuit, each summing junction coupled to a DC offset compensation signal, whereby a DC offset in the closed loop voltage feedback signal is reduced.

5. The compensator according to claim 1, wherein the demodulator further comprises an operator for demodulating inputs α and β based on an input vector angle θ in accordance with the following equations:

$$d = \alpha \cos\theta + \beta \sin\theta$$

$$q = \beta \cos\theta - \alpha \sin\theta$$

where d and q represent demodulated voltage error feedback signals.

6. The compensator according to claim 1, wherein the demodulator extracts a DC reference in a rotating vector reference frame.

7. The compensator according to claim 6, further comprising a signature frequency for extracting the DC reference, wherein the signature frequency is a fundamental AC component frequency of the motor.

8. The compensator according to claim 6, further comprising an integrator coupled to the demodulator for receiving the DC reference and contributing to the DC offset compensation signal to force the error signal to zero.

9. A method for compensating a DC offset in a motor drive control system, comprising:
   demodulating a closed loop feedback voltage error signal to provide a demodulated output;
   supplying the demodulated output to a DC offset compensator to provide a DC offset compensation signal; and
   combining the DC offset compensation signal with the closed loop voltage feedback error signal to influence the voltage error signal to reduce a DC offset voltage.

10. The method according to claim 9, further
   comprising demodulating a plurality of voltage error signals; and
   supplying the plurality of voltage error signals to said DC offset compensator to provide a plurality of DC offset compensation signals.

11. The method according to claim 9, further comprising applying a vector angle signal to contribute to demodulating the voltage error signal.

12. The method according to claim 10, further comprising combining said a plurality of DC offset compensation signals with a plurality of voltage error signals to influence the plurality of voltage error signals to compensate a DC offset voltage.

13. The method according to claim 11, wherein demodulating further comprises applying a voltage error signal represented by α and β and vector angle θ in accordance with the following equations:

$$d = \alpha \cos\theta + \beta \sin\theta$$

$$q = \beta \cos\theta - \alpha \sin\theta$$

where d and q represent demodulated voltage error signals.

14. A DC offset compensator in a motor drive control system for reducing voltage offset in a motor voltage feedback signal, comprising:
   an operator device for receiving a control voltage error signal and a vector angle signal provided by the motor drive control system and producing a compensation signal based on the control voltage error signal and the vector angle signal suitable for combination with the motor voltage feedback signal to influence the motor voltage feedback signal to reduce an offset voltage in the motor voltage feedback signal during motor operation, wherein said operator device produces a plurality of compensation signals.

15. A DC offset compensation circuit in a motor drive control system, comprising:
   a demodulator for extracting a DC offset reference in a rotating vector reference, the demodulator operating at a frequency substantially matching that of a fundamental AC component frequency for the motor;
   a DC offset compensator coupled to the demodulator for receiving the extracted DC offset reference and providing a compensation signal related to reducing the DC offset; and
   a junction element coupled to the DC offset compensator for receiving the compensation signal and appropriately applying the compensation signal in a closed loop feedback system of the motor drive control system to influence a voltage feedback signal to drive a voltage error signal to zero.

16. The compensator according to claim 15, wherein the DC offset compensator includes an integrator.

17. The compensator according to claim 16, wherein an update time for the DC offset compensator is within approximately one second.

18. A DC offset compensator in a motor drive control system for reducing voltage offset in a motor voltage feedback signal, comprising:
   an operator device for receiving a control voltage error signal including a DC offset and a vector angle signal provided by the motor drive control system, and demodulating said control voltage error signal to produce a compensation signal based on the control voltage error signal and the vector angle signal suitable for combination with the motor voltage feedback signal to influence the motor voltage feedback signal to reduce said DC offset voltage in the motor voltage feedback signal during motor operation, wherein said operator device produces a plurality of compensation signals.

* * * * *